US008896622B2

(12) United States Patent
Winnemoeller et al.

(10) Patent No.: US 8,896,622 B2
(45) Date of Patent: Nov. 25, 2014

(54) METHODS AND APPARATUS FOR MARKER-BASED STYLISTIC RENDERING

(75) Inventors: Holger Winnemoeller, Seattle, WA (US); Romain Vergne, Bordeaux (FR)

(73) Assignee: Adobe Systems Incorporated, San Jose, CA (US)

( * ) Notice: Subject to any disclaimer, the term of this patent is extended or adjusted under 35 U.S.C. 154(b) by 637 days.

(21) Appl. No.: 12/857,397

(22) Filed: Aug. 16, 2010

(65) Prior Publication Data

US 2013/0120393 A1    May 16, 2013

Related U.S. Application Data

(60) Provisional application No. 61/240,138, filed on Sep. 4, 2009.

(51) Int. Cl.
*G09G 5/00* (2006.01)
*G06T 11/00* (2006.01)

(52) U.S. Cl.
CPC ...................................... *G06T 11/00* (2013.01)
USPC ......................................................... 345/619

(58) Field of Classification Search
USPC ......................................................... 345/619
See application file for complete search history.

(56) References Cited

U.S. PATENT DOCUMENTS

| 5,847,712 | A  | * | 12/1998 | Salesin et al. | 345/582 |
|---|---|---|---|---|---|
| 5,990,901 | A  | * | 11/1999 | Lawton et al. | 345/581 |
| 6,762,769 | B2 | * | 7/2004  | Guo et al. | 345/582 |
| 7,039,222 | B2 | * | 5/2006  | Simon et al. | 382/118 |
| 7,068,277 | B2 | * | 6/2006  | Menache | 345/473 |
| 7,187,788 | B2 | * | 3/2007  | Simon et al. | 382/118 |
| 7,274,372 | B1 |   | 9/2007  | Lake et al. | |
| 7,639,250 | B2 |   | 12/2009 | Xu et al. | |
| 7,714,866 | B2 | * | 5/2010  | Sander | 345/441 |
| 2002/0081003 | A1 | * | 6/2002  | Sobol | 382/118 |
| 2002/0122043 | A1 | * | 9/2002  | Freeman et al. | 345/582 |
| 2004/0165787 | A1 | * | 8/2004  | Perez et al. | 382/284 |
| 2004/0170337 | A1 | * | 9/2004  | Simon et al. | 382/254 |
| 2005/0035979 | A1 | * | 2/2005  | Mukoyama et al. | 345/619 |
| 2006/0028481 | A1 | * | 2/2006  | Zhang et al. | 345/582 |
| 2006/0077471 | A1 | * | 4/2006  | Wang | 358/3.29 |
| 2007/0002071 | A1 | * | 1/2007  | Hoppe et al. | 345/582 |
| 2007/0109310 | A1 | * | 5/2007  | Xu et al. | 345/581 |
| 2008/0001963 | A1 | * | 1/2008  | Lefebvre et al. | 345/582 |

(Continued)

OTHER PUBLICATIONS

Secord, A. 2002. Weighted Voronoi stippling. In Proceedings of the 2nd international Symposium on Non-Photorealistic Animation and Rendering (Annecy, France, Jun. 3-5, 2002). NPAR '02. ACM, New York, NY, 37-43.

(Continued)

*Primary Examiner* — Kee M Tung
*Assistant Examiner* — Hoai Le
(74) *Attorney, Agent, or Firm* — Wolfe-SBMC

(57) ABSTRACT

Methods and apparatus for marker-based stylistic rendering may be used to automatically synthesize the stylistic range of various stylistic rendering techniques. An image processing pipeline may automatically generate stylistic images, such as Hedcut stipple images. Using virtual markers to determine locations in the image to which physical markers are to be attached, the tone of an original source image may be automatically reproduced via placement of stipple dots or other physical markers, while at the same time allowing for stylistic refinement of placement and appearance of the physical markers, e.g. along strong features in the source image.

20 Claims, 9 Drawing Sheets

(56) References Cited

U.S. PATENT DOCUMENTS

| | | | |
|---|---|---|---|
| 2008/0024505 A1* | 1/2008 | Gordon et al. | 345/473 |
| 2008/0267443 A1* | 10/2008 | Aarabi | 382/100 |
| 2011/0012910 A1* | 1/2011 | Wei et al. | 345/582 |

OTHER PUBLICATIONS

Xu K., Cohren-Or D., Ju T., Liu L., Zhang H., Zhou S., Xiong Y. Feature-Aligned Shape Texturing. Proceedings of ACM SIGGRAPH Asia. 2009.

Porter, T. and Duff, T. 1984. Compositing digital images. SIGGRAPH Comput. Graph. 18, 3 (Jul. 1984), 253-259.

Gu, L. and Kanade, T. A Generative Shape Regularization Model for Robust Face Alignment. Proceedings of the 10th European Conference on Computer Vision. 2008.

S. Hiller, H. Hellwig, and O. Deussen, Beyond stippling—Methods for distributing objects on the plane, Computer Graphics Forum, 22, 2003, pp. 515-522.

* cited by examiner

Distribution (D) | quantized distance transform of flow field (V) | Tone map (P)

METHODS AND APPARATUS FOR MARKER-BASED STYLISTIC RENDERING

PRIORITY INFORMATION

This application claims benefit of priority of U.S. Provisional Application Ser. No. 61/240,138 entitled "Methods and Apparatus for Virtual Marker-Based Stylistic Rendering" filed Sep. 4, 2009, the content of which is incorporated by reference herein in its entirety.

BACKGROUND

Description of the Related Art

Various stylistic rendering techniques may be used by artists to render a stylized image representing a source image. Stippling is an example stylistic rendering technique to approximate the tone of an image with a collection of small surface marks, usually dots of varying size. FIG. 1A illustrates a conventional stipple drawing. A darker tone is achieved by larger dots or closer spacing of dots, while a lighter tone is achieved with smaller dots or larger spacing. Several techniques exist to automatically convert a grayscale image into a stipple drawing.

Hedcut stippling is another example of a stylistic rendering technique. FIG. 1B illustrates a conventional Hedcut stipple drawing. As a stylistic rendering technique, artists have refined pure tonal stippling to include various artistic elements. Hedcut stippling distinguishes itself from pure tonal stippling by adjusting the local stippling style to photometric, semantic, and surface features. For example, features such as eyes, the mouth, hair, and accessories (e.g. glasses) are often not stippled, but drawn very realistically. Furthermore, the stippling dots often are not purely randomly distributed, but follow perceived surface shape contours, thus providing not only tone cues, but shape cues, as well.

SUMMARY

Various embodiments of methods and apparatus for marker-based stylistic rendering are described. Embodiments may provide marker-based stylistic rendering methods that may automatically synthesize, from an image of a scene such as a digital photograph or digitized photograph, a stylized output image that includes more of the stylistic range of stylistic rendering techniques, such as Hedcut stippling techniques or other stylistic rendering techniques, when compared to conventional methods by accounting for additional features. In addition, embodiments may provide high-level artistic tools that allow a user to generate user-directed stippled drawings, or drawings using other textures or markers, with relative ease and flexibility. Embodiments may provide a stylistic rendering image processing pipeline that may be used, for example, to automatically generate marker-based images such as stipple images, Hedcut stipple images, or images exhibiting other stylistic renderings or using other markers such as cross-hatching, engraving, woodcut, or any other suitable existing or new marker styles. Embodiments may reproduce the tone of an original source image via placement of stipple dots or other physical markers, while at the same time allowing for stylistic refinement of placement of the physical markers, for example along strong features or directionally aligned with strong features (i.e., following the feature "flow") in the source image. The stylistic rendering image processing pipeline may be used to generate not only stipple images, but also hatchings and renderings based on arbitrary shapes including user-drawn primitives, and in general to generate or modify various types of images using any type of physical marker.

In some embodiments of a marker-based stylistic rendering method, an input image may be obtained. Tone mapping may be performed to produce a tone map. A tone map may indicate the tonal range (brightness, or luminance) of the input image. Feature maps may be generated, for example from the tone map. An edge map may be generated that indicates edges of objects in the scene. Virtual markers may be placed on the image plane, for example using one of several techniques including a technique in which the image is recursively divided into patches, where each patch includes a distribution of one or more virtual markers. The virtual markers are "virtual" in that they do not have a physical extent. The virtual markers are point positions in the image. However, in some embodiments, virtual markers may be associated with additional information, for example orientation or other information. A physical marker may be associated with each virtual marker. In some embodiments, different types of physical markers may be associated with different ones of the virtual markers. The markers may be adjusted as necessary. Placing virtual markers and physical markers, and adjusting markers may be guided, for example according to one or more of the generated feature maps. In some embodiments, placing virtual markers and physical markers and adjusting markers may be repeated until convergence. The edge map and output of the marker adjustment may be combined to generate an output image exhibiting the desired stylistic effect, for example Hedcut stippling.

Figure 1A:
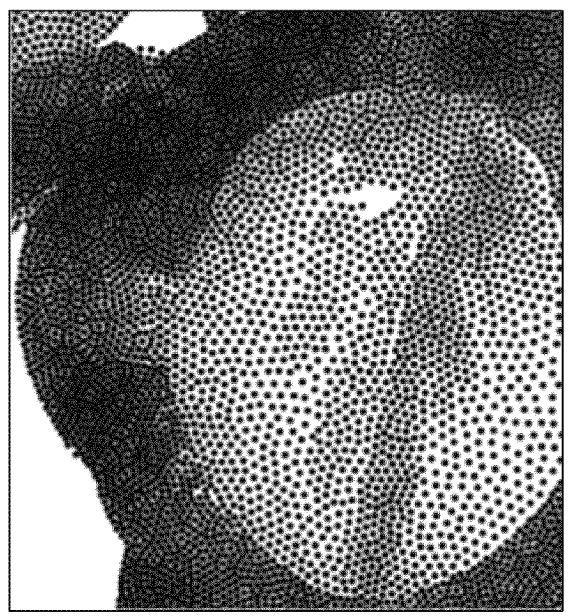
FIG. 1A illustrates a conventional stipple drawing.
Figure 1B:
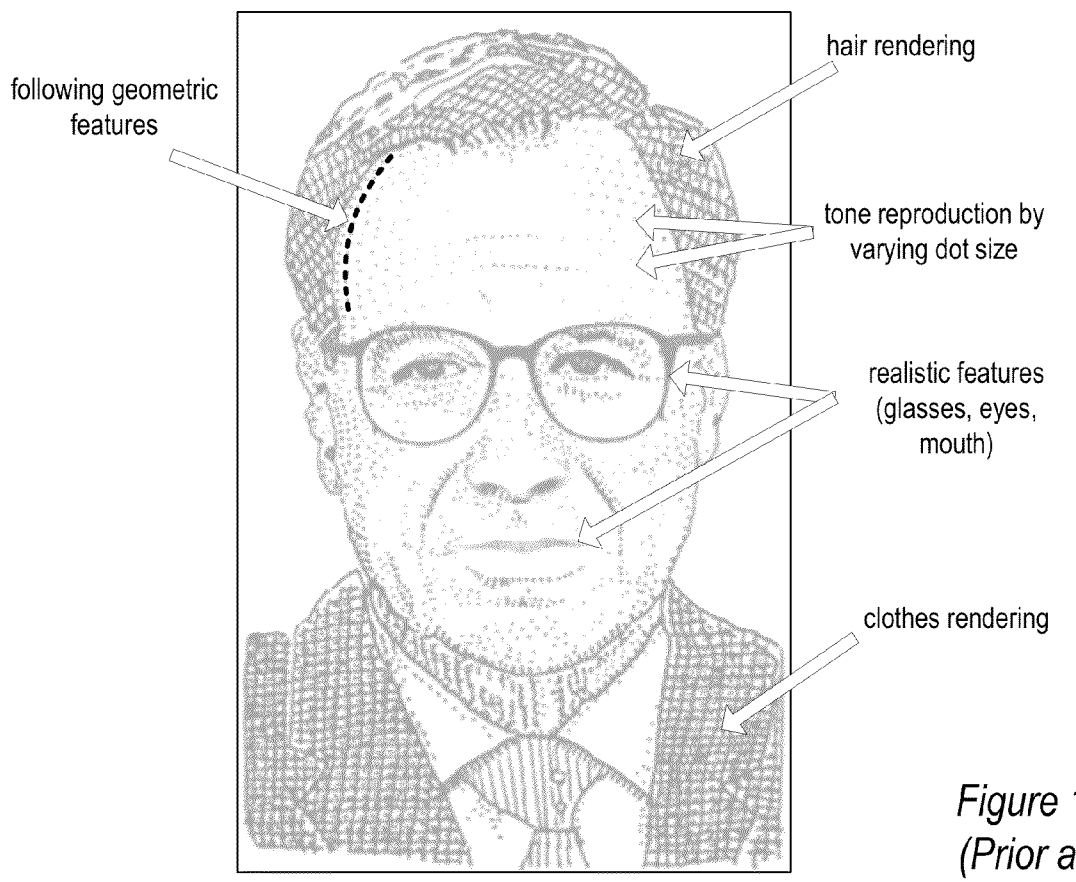
FIG. 1B illustrates a conventional Hedcut stipple drawing.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for marker-based stylistic rendering are described. Embodiments may provide marker-based stylistic rendering methods that may automatically synthesize, from an image of a scene such as a digital photograph or digitized photograph, a stylized output image that includes more of the stylistic range of stylistic rendering techniques, such as Hedcut stippling techniques or other stylistic rendering techniques, when compared to conventional methods by accounting for additional features. In addition, embodiments may provide high-level artistic tools that allow a user to generate user-directed stippled drawings, or drawings using other textures or markers, with relative ease and flexibility.

Embodiments may provide a stylistic rendering image processing pipeline that may, for example, be used to automatically generate marker-based images, such as Hedcut stipple images, or other stylistic renderings, from input images of scenes. Embodiments may reproduce the tone of an original source image via placement of stipple dots or other physical markers, while at the same time allowing for stylistic refinement of placement of the physical markers, for example along strong features or directionally aligned with strong features (i.e., following the feature "flow") in the source image. The stylistic rendering image processing pipeline may be used to generate not only stipple images, but also hatchings and stylistic renderings based on arbitrary shapes including user-drawn primitives, and in general to generate or modify various types of images using any type of physical marker.

Figure 11:
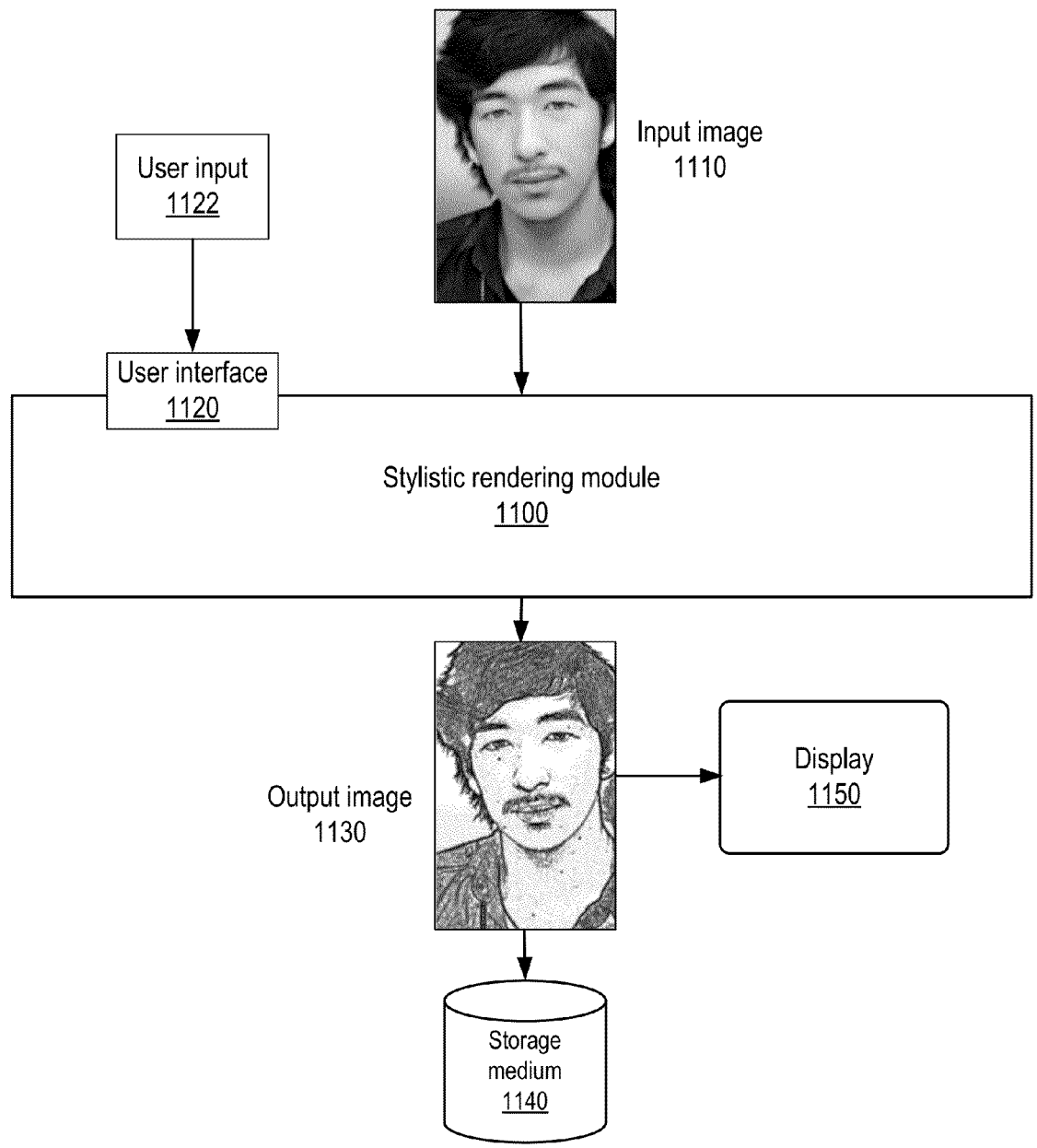
FIG. 11 illustrates an example stylistic rendering module, according to some embodiments.
Figure 12:
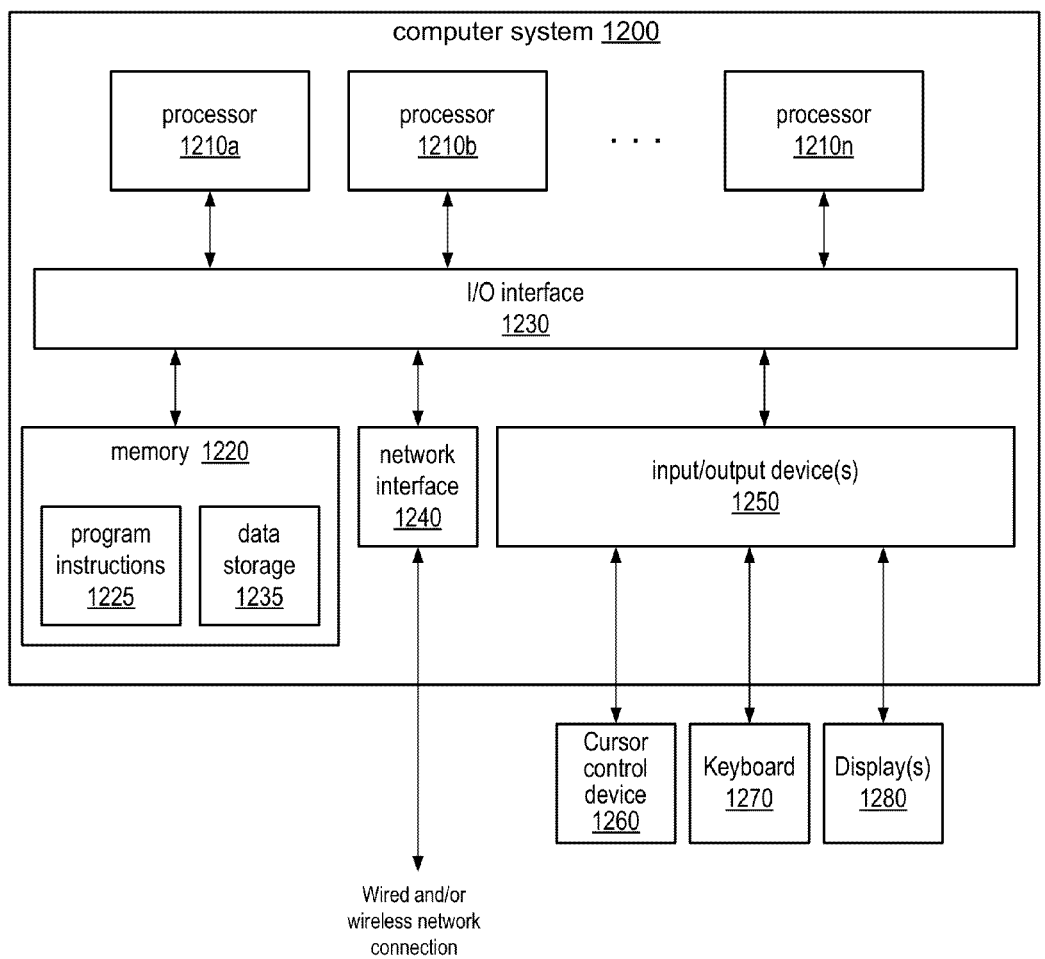
FIG. 12 illustrates an example computer system that may be used in embodiments.

Embodiments of the marker-based stylistic rendering methods and the stylistic rendering image processing pipeline described herein may be performed by a stylistic rendering module implemented by program instructions stored in a computer-readable storage medium and executable by one or more processors (e.g., one or more CPUs or GPUs). Embodiments of a stylistic rendering module may, for example, be implemented as a stand-alone application, as a module of an application, as a plug-in for applications including image processing applications, and/or as a library function or functions that may be called by other applications such as image processing applications. Embodiments of the stylistic rendering module may be implemented in any image processing application, including but not limited to Adobe® Photo-Shop® Adobe® PhotoShop® Elements®, Adobe® Illustrator®, and Adobe® After Effects®. "Adobe", "Photoshop", "Elements", "Illustrator", and "After Effects" are either registered trademarks or trademarks of Adobe Systems Incorporated in the United States and/or other countries. An example stylistic rendering module that may implement the marker-based stylistic rendering methods and the stylistic rendering image processing pipeline as described herein is illustrated in FIG. 11. An example system on which a stylistic rendering module may be implemented is illustrated in FIG. 12.

Stylistic Rendering Mage Processing Pipeline

Figure 2:
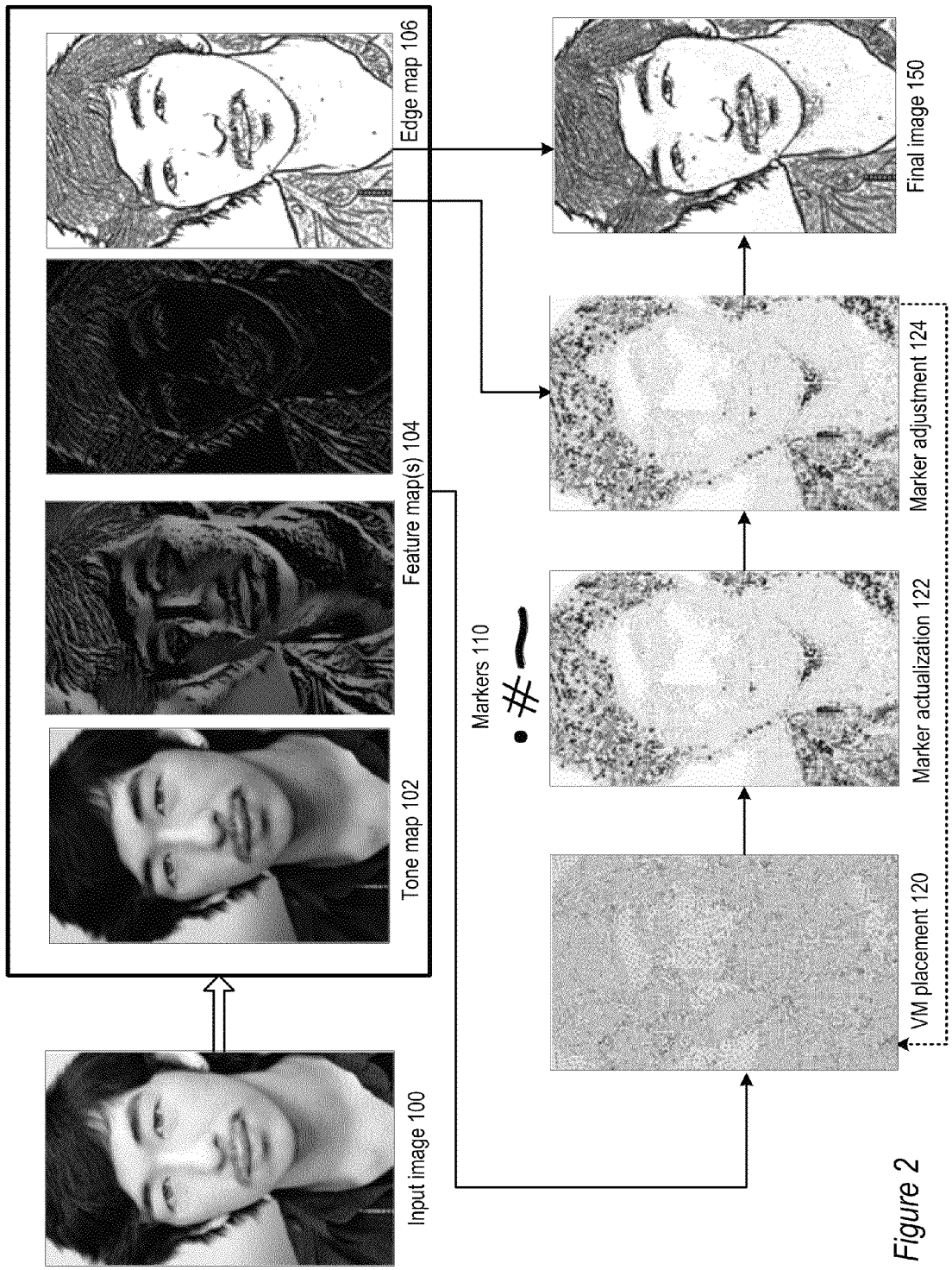
FIG. 2 illustrates an example stylistic rendering image processing pipeline according to at least some embodiments.

FIG. 2 illustrates an example stylistic rendering image processing pipeline according to at least some embodiments. FIG. 2 is not intended to be limiting. The pipeline may implement a marker-based stylistic rendering method. An input image 100 of a scene, for example a digital photograph or digitized photograph, may be obtained. Tone mapping may be performed to produce a tone map 102. Tone map 102 may indicate the tonal range (brightness, or luminance) of the input image. One or more feature map(s) 104 may be generated, for example from the tone map 102 and/or from the original image 100. While FIG. 2 shows feature map(s) 104 as image data such as pixel maps or bit maps, feature map(s) 104 may be provided in functional or parametric form instead of or in addition to image data in at least some embodiments. An edge map 106 may be generated that indicates edges of objects in the scene. Virtual marker (VM) placement 120 may be performed in which virtual markers may be placed on the image plane, for example using patching techniques as described herein. Marker actualization 122 may be performed in which a physical marker 110 is associated with each virtual marker. A virtual marker indicates a point location on an image plane, and may not be displayed; a physical marker 110 is an image primitive that indicates some shape (dot, line, crosshatch, pattern, etc.) that is to be displayed in the final output at a location indicated by a virtual marker. In at least some embodiments, a physical marker may be represented by a bounding box and the bits or pixels that indicate the shape. In at least some embodiments, instead of or in addition to bits or pixels that indicate a shape, a physical marker may contain vector information or other information that indicates a shape. In some embodiments, different types of physical markers 110 may be associated with different ones of the virtual markers in an image. In some embodiments, a single physical marker 110 may, in at least some cases, be associated with two or more virtual markers. Marker adjustment 124 may be performed in which the markers 110 may be adjusted as necessary to achieve a desired coverage. VM placement 120, marker actualization 122, and marker adjustment 124 may be guided, for example according to one or more of the generated feature maps. In some embodiments, VM placement 120, marker actualization 122, and marker adjustment 124 may be repeated until convergence, as indicated by the dashed line. For example, convergence may be reached when no markers are added, removed, or adjusted, or alternatively when fewer markers are added, removed, and adjusted than a specified threshold. The edge map 106 and output of the marker adjustment 124 may be combined to generate an output image 150 exhibiting the desired stylistic effect, for example Hedcut stippling.

The following describes elements of the stylistic rendering image processing pipeline in detail.

Tone-Mapping

Various operations in the stylistic rendering image processing pipeline may involve the "brightness" value of a given pixel. A general tone-mapping function may be defined as:

$$f_{tonemap}: R^{colorspace} \longmapsto R$$

which maps values in an N-Dimensional color space to a single grayscale value. Examples of possible color spaces include, but are not limited to, grayscale (one value), RGB (three values), RGBA (four values), and CMYK (four values). Such functions may be implemented in various embodiments, for example, via arithmetic computations, via a lookup table, or via a parametric curve such as a Hermite curve. A parametric curve may have the advantage of being easily visualized and edited by a user.

Feature Map(s)

In at least some embodiments, based on the tone-mapped source image (tone map 102 in FIG. 2) and/or based on the original image 100, the image processing pipeline may automatically compute one or more feature maps 104. In addition, a user may generate and input one or more feature maps 104, or one or more feature maps may be otherwise obtained or generated. Feature maps 104 may include one or more of, but are not limited to, gradient maps, difference-of-Gaussians maps, curvature maps, edge-tangent-flow maps, and maps of any other suitable image feature. In some embodiments, some feature maps 104 may include high-level semantic information, such as location and extent of facial features, including nose, mouth, eyes, eyebrows, etc. Additionally, in some embodiments, some feature maps 104 may include user-specified information, such as masks, blending weights, manual size distributions, user-entered paint strokes, or any other suitable feature map. While FIG. 2 shows feature map(s) 104 as image data such as pixel maps or bit maps, feature map(s) 104 may be provided in functional or parametric form instead of or in addition to image data in at least some embodiments.

While FIG. 2 shows, and this document generally describes, tone map 102 and edge map 106 separately from feature maps 104, it is to be noted that tone map 102 and edge map 106 may be considered as special cases of feature maps 104. Generally defined, a feature map 104 is a structure that represents information related to an image of the scene that may be used in the pipeline to produce a stylized representation of the scene. A feature map 104 may be derived from the image of the scene or otherwise obtained. Feature maps 104 may be manually and/or automatically generated from the input image, from other feature maps, or from a combination of the input image and feature maps or a combination of feature maps. In addition, feature maps 104 may be otherwise obtained, for example as input from the user such as a sketch. As noted above, a feature map 104 may be in the form of digital image data such as pixel maps or bit maps or may be provided in functional or parametric form. Examples of image features that may be represented by feature maps include, but are not limited to tonal features (e.g., the tone map), edge features (e.g., the edge map), flow features (a flow map), masks, gradients, difference-of-Gaussians, curvature, weights, distributions and edge-tangent-flow.

Virtual Marker Placement

Figure 3A:
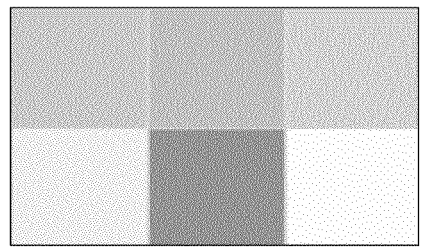
FIGS. 3A through 3C illustrate examples of different patching techniques according to some embodiments.
Figure 3B:
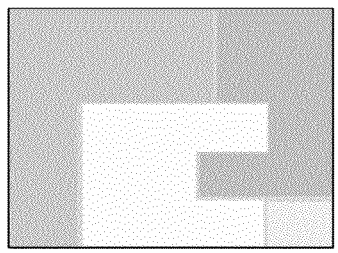
Figure 3C:
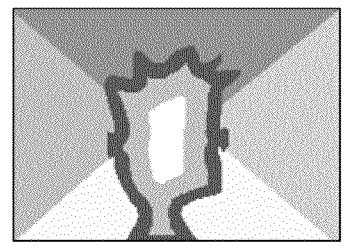

Referring to FIG. 2, in at least some embodiments of virtual marker placement 120, the stylistic rendering image processing pipeline creates patches for the image, with one or more virtual markers on each patch. The patches are created to tile the image plane. In various embodiments, the tiling may be regular, as illustrated by the example shown in FIG. 3A, or irregular, as illustrated by the example shown in FIG. 3B. In some embodiments, the patches and tiling may conform to features represented in a feature map 104. FIG. 3C illustrates an example of feature-aligned patches, according to some embodiments.

To create the patches, the method may subdivide the image into patches. The image may be subdivided into a regular grid of patches or an irregular grid of patches. The patches may be square, rectangular, triangular, or some other regular or irregular geometric shape, or may be arbitrary shapes. In some embodiments, the image may be subdivided into an alignment of patches that follow feature curves, guided by one or more feature maps 104, to achieve geometric alignment. In some embodiments, the image may be recursively divided into patches until an appropriate patch size is achieved. In some embodiments, different areas of the image may be subdivided into patches differently, for example based on one or more automatically generated or user-defined masks that are included in the feature maps 104, to achieve different effects. In some embodiments, patches for different regions may use different distributions of virtual markers and/or different types of physical markers to achieve different effects.

The size of the patches may depend on how many markers are needed to achieve a desired effect. In some embodiments that use a recursive technique to subdivide the image into patches, the technique may start with one patch including a distribution of virtual markers, and recursively subdivide the image into smaller patches (each including the distribution of virtual markers) until the desired size is reached that will provide an appropriate initial distribution of virtual markers. Using this method, the more the image is subdivided, the more densely packed the virtual markers become. For a lower density of virtual markers, fewer levels of subdivision may be performed. For a higher density of virtual markers, more levels of subdivision may be performed. In some embodiments, different levels of subdivision may be applied for different regions of the image, for example according to one or more masks, to achieve different densities in different regions.

Figure 4A:
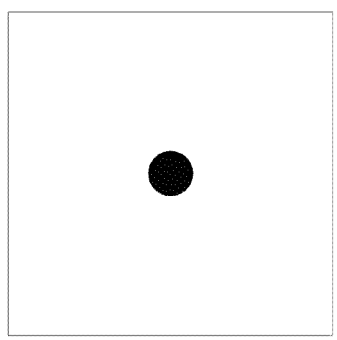
FIGS. 4A through 4C illustrate placement of virtual markers in patches according to some embodiments.
Figure 4B:
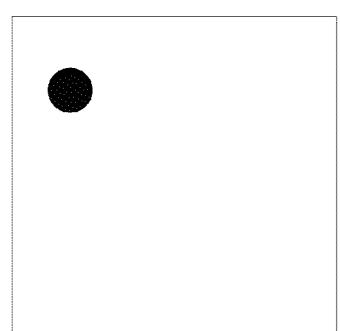
Figure 4C:
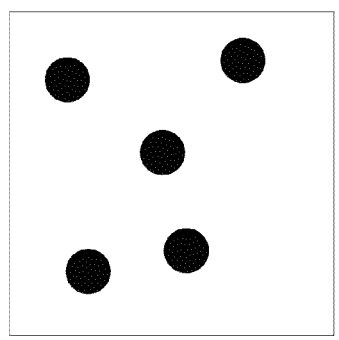

Each patch may contain one or more virtual markers, which may each be specified by their respective location within the patch. A location may be specified in different ways. For example, in some embodiments, a virtual marker location may be specified in terms of a local coordinate frame that is defined by the bounding box of the patch and aligned with an arbitrary global coordinate frame. In some embodiments, the placement of virtual marker(s) may be random within a respective patch. In some embodiments, there may be more than one virtual marker assigned to any given patch, and the virtual markers may be arranged in any symmetric or asymmetric arrangement. FIG. 4A graphically illustrates the placement of a single virtual marker symmetrically within a patch. FIG. 4B graphically illustrates the placement of a single virtual marker asymmetrically within a patch. FIG. 4C graphically illustrates the placement of multiple virtual markers asymmetrically within a patch. In some embodiments, patches in different regions may use different distributions of virtual markers to achieve different effects.

Note that virtual markers are "virtual" in that the virtual markers are not physical markers and do not have a physical extent; the virtual markers are point positions in the image. The virtual markers may not be displayed; in some embodiments the locations of the virtual markers may be displayed, but only the physical markers and not the virtual markers are rendered in the final image. The virtual markers are used in embodiments for distributing locations for the physical markers in the image. In some embodiments, virtual markers may be associated with additional information, for example orientation or other information.

Referring again to FIG. 2, in at least some embodiments, the shape and/or size of patches, the tiling of the image plane, and the placement of virtual markers inside the patches may be guided by one or more feature maps 104 to achieve various effects. Examples of these effects may include, but are not limited to: providing even distribution of virtual markers in the image plane; providing distribution of virtual markers with noise properties, such as white noise or blue noise; and providing tone reproduction: distribution of virtual markers such that their local density is proportional to the local tonal brightness of a tone map.

The above list of examples is not intended to be limiting. Patch shape and/or size, tiling, and placement of virtual markers (along with various types of physical markers 110) may be used to achieve other effects, or combinations thereof, within images.

Virtual Marker Placement Based on Texture Synthesis

Figure 5:
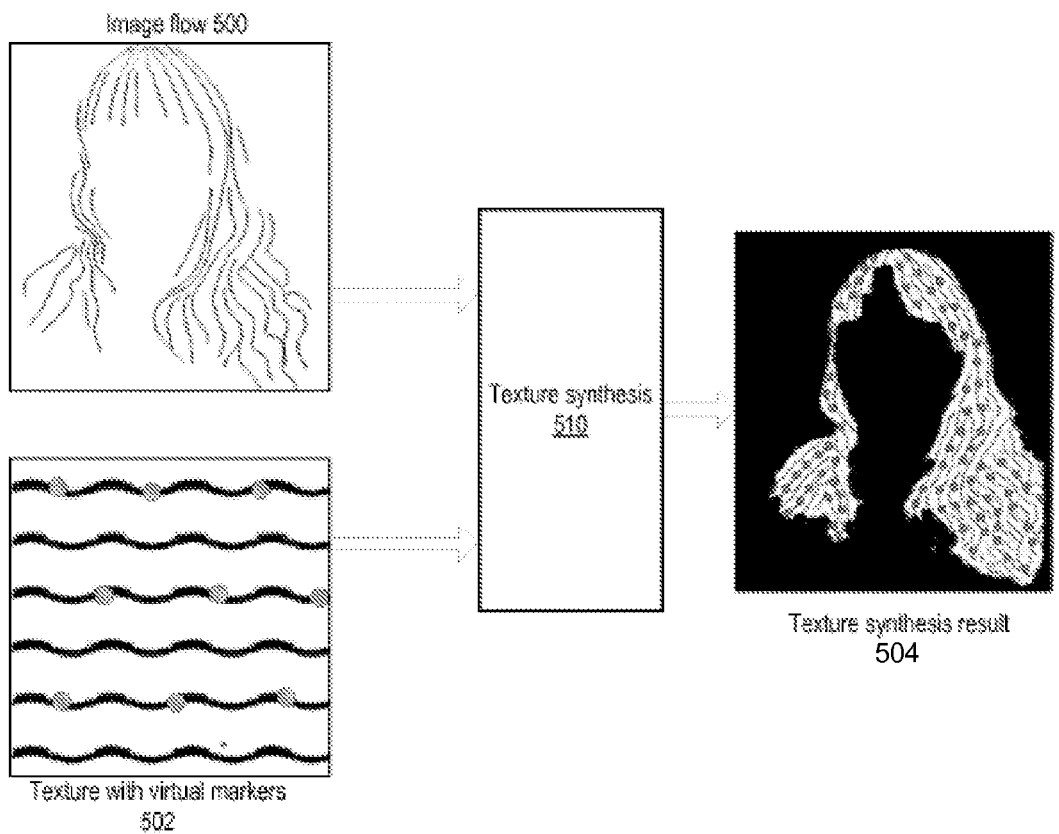
FIG. 5 illustrates virtual marker placement based on texture synthesis, according to some embodiments.

FIG. 5 illustrates a virtual marker placement technique based on texture synthesis that may be used in some embodiments. In these embodiments, to place virtual markers, a texture 502 may be designed with virtual markers placed inside it. A flow 500 may also be obtained; for example flow 500 may be automatically derived from an input image or may be obtained by user input sketching a desired flow 500 for the image. Note that flow 500 may be a feature map 104 as shown in FIG. 2. The texture 502 may then be applied to the image according to flow 500 using a texture synthesis technique 510, for example a flow-guided texture synthesis technique. The virtual markers may be placed within an image based on their relative position within the texture 502 and the texture synthesis result 504. This results in a distribution of virtual markers that are spaced similarly to the distribution in the texture 502, but at the same time follow the basic flow 500. In FIG. 5, the small gray circles in texture 502 and result 504 represent the positions of virtual markers.

Virtual Marker Placement Using Texture Rotation, Translation and Scaling

Figure 6:
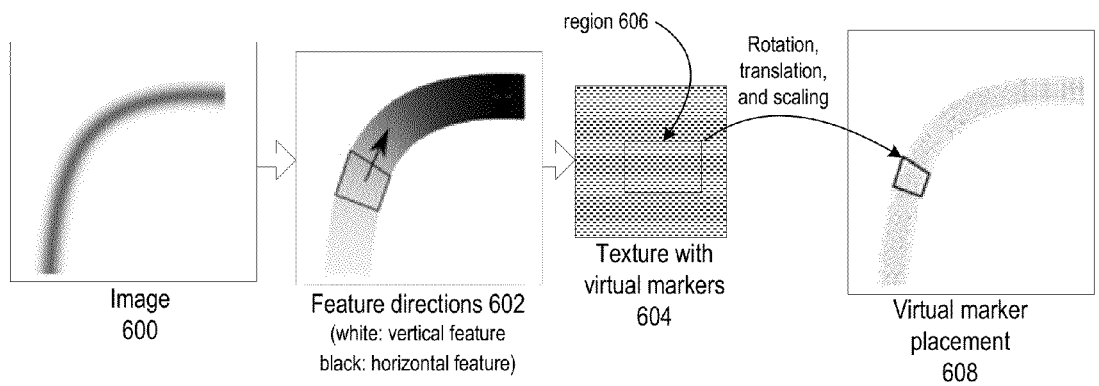
FIG. 6 illustrates virtual marker placement using texture rotation, translation and scaling, according to some embodiments.

FIG. 6 illustrates virtual marker placement using a texture rotation, translation and scaling technique, according to some embodiments. In some embodiments, virtual markers may be placed by transforming a texture 604 differently on different regions of the image 600. By combining different transformations of the texture 604, the virtual markers may be aligned with the feature directions indicated by one or more feature maps. The flow directions of the features (feature directions 602) are computed or obtained. A region 606 in the texture is selected for each direction. In a virtual marker placement 608 process, the virtual markers which are inside this region 606 may then be rotated, translated and scaled in order align the virtual markers with the directions. The scaling operation can be used to obtain the desired density of virtual markers. In some embodiments, a subdivision step of the virtual markers may be used to increase or decrease the final distribution.

Marker Actualization

Figures 7A, 7B, 7C:
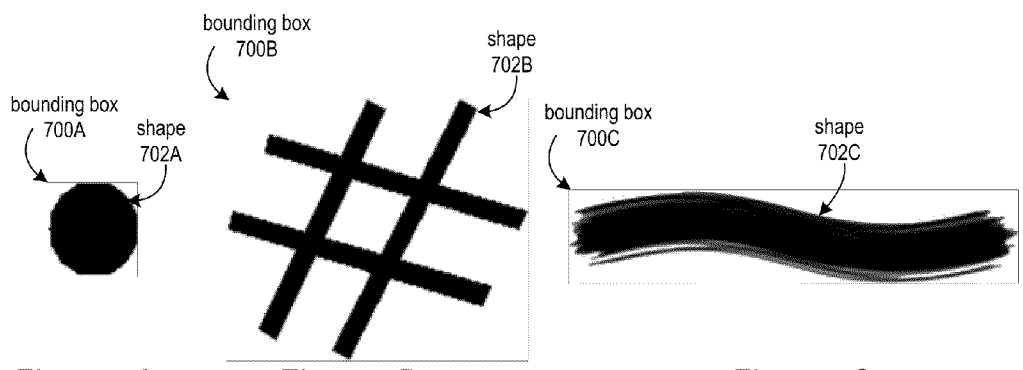
FIGS. 7A through 7C illustrate examples of physical markers according to some embodiments.

As shown in FIG. 2, marker actualization 122 may be performed after virtual marker placement 120. Given a virtual marker inside a patch, along with a local coordinate frame of the patch, the virtual marker can be actualized, that is, can be associated with a physical marker 110, such as a dot, some possibly intersecting lines, a geometric shape such as a circle, triangle, or rectangle, or some other user-defined texture or primitive. FIGS. 7A through 7C illustrate some examples of physical markers 110. The markers shown in FIGS. 7A through 7C are not intended to be limiting; physical markers may be any arbitrary shape and may include user-drawn primitives. FIGS. 7A through 7C illustrate that each physical marker 110 may include a respective bounding box 700A, 700B, 700C and a shape 702A, 702B, 702C. A physical marker 110 may be considered an image primitive. While FIGS. 7A through 7C show black and white or grayscale shapes, in at least some embodiments, the shapes may exhibit color properties.

Figure 8:
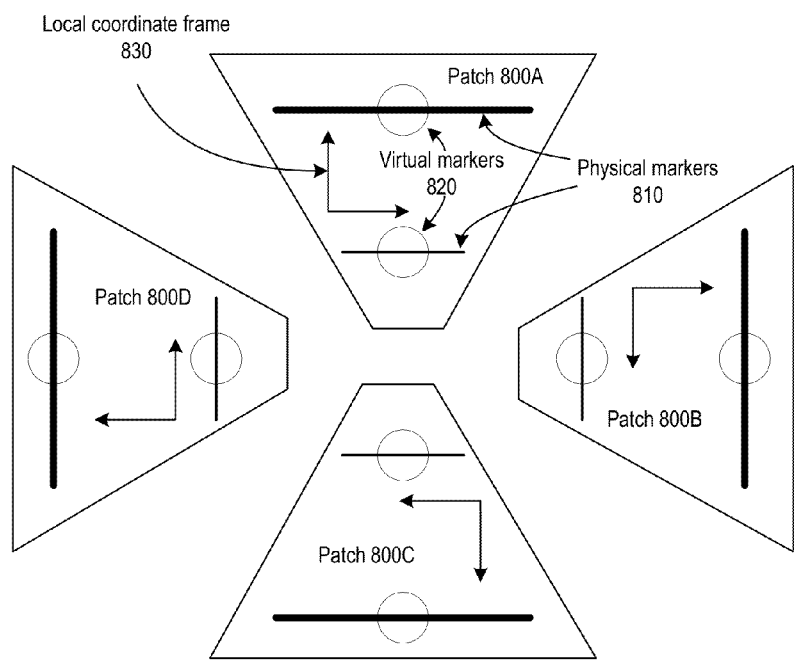
FIG. 8 illustrates guided placement of physical markers according to some embodiments.

In some embodiments, the physical markers 110 may be attached to virtual markers as guided by one or many feature maps 104. In some embodiments, the physical markers 110 may be attached to virtual markers as guided by properties that may be encoded per virtual marker or per patch. For example, in some embodiments as illustrated in FIG. 8, each patch 800A, 800B, 800C, 800D may have a local coordinate frame 830 attached to it so that physical markers 810 (represented by lines) attached to the virtual markers 820 (represented by circles) of the patch 800A, 800B, 800C, 800D are parallel to other physical markers 810 in the same patch, but possibly not parallel to physical markers 810 in other patches 800A, 800B, 800C, 800D.

Referring again to FIG. 2, in some embodiments, a physical marker 110 is not constrained to be entirely drawn inside a patch. For example, a physical marker 110 drawn from a virtual marker may join, intersect, or overlap one or more other physical markers 110 in the same patch or in another patch.

In some embodiments, in addition to orientation and position within a patch, one or more other properties of physical markers 110, including but not limited to size, color, transparency, and marker type, may be guided by feature maps 104, properties of patches, or via other methods or combinations thereof.

In some embodiments, a single physical marker may be attached to two or more virtual markers.

Marker Adjustment

As shown in FIG. 2, marker adjustment 124 may be performed after marker actualization 122 to achieve a target coverage. If a goal of the virtual marker placement 120 is tone reproduction, then not only the distribution of virtual markers matters; the coverage of the physical markers 110 also matters. The coverage (or density) of a physical marker 110 may be related to its physical properties such as area, size, shape, color, and brightness. A technique to measure coverage for an individual marker 110 that may be used in some embodiments is to obtain or compute its bounding box, or convex hull, and then to lay a grid over this construct. In theory, the size of each grid cell should approach zero, but in practice, a small number compared to the size of the construct suffices.

In some embodiments, for each grid cell that overlaps with the construct, a brightness value may be computed, summed up, and finally divided by the total number of overlapping cells. The coverage value is then one minus the final value. In some embodiments, for specific physical markers 110 (such as circles, rectangles, etc.), an analytic formulation of coverage may be derived.

In some embodiments, coverage for a patch may be computed similarly to coverage for a physical marker 110. The patch geometry may define the construct, and all physical markers 110, as they appear in the patch, may be assumed to form a new super-physical marker. The coverage computation for a patch may then be performed similarly to that described for a physical marker 110.

In some embodiments, the equivalent brightness of a patch is its coverage multiplied by its area. In some embodiments, in order to approximate the tone/brightness of an associated feature map by coverage, instead of or in addition to adjusting the virtual marker placements, the physical properties of the physical markers such as size, shape, brightness, color, etc., may be appropriately adjusted.

Various maps, such as one or more feature maps 104 and/or an edge map 106, may contribute to the coverage computation. In the case of an edge map 106, its contribution to tone of the final image may be accounted for by initializing the coverage computation (i.e. without contribution of any virtual markers or physical markers) with the coverage of the edge map 106.

Coverage Adjustment

In various embodiments, various steps may be taken to decrease or increase physical marker 110 coverage, such as choosing physical markers 110 with smaller or larger coverage, decreasing/increasing the brightness of a physical marker 110, adjusting the size and/or shape of a physical marker 110, changing the color(s) of a physical marker 110, and in general adjusting one or more of the physical properties of the physical marker 110. In some embodiments, the distribution of virtual markers 110 may also be adjusted to increase or decrease coverage by increasing or decreasing the spacing of virtual markers within a patch.

Referring again to FIG. 2, in some embodiments, virtual marker placement 120, marker actualization 122, and marker adjustment 124 may be performed as separate steps and iteratively optimized, as indicated by the dashed arrow. Alternatively, in some embodiments, virtual marker placement 120, marker actualization 122, and marker adjustment 124 may be performed and optimized collectively.

Feature Adjustments

Referring again to FIG. 2, in addition to tone reproduction, other stylistic rendering effects may be obtained via virtual marker and/or physical marker manipulation in various embodiments, such as aligning virtual marker distribution with feature maps 104. Feature maps 104 may include, but are not limited to, edges, edge-tangent flow (ETF), curvature, etc. For example, one feature adjustment is to align virtual markers along ETF lines.

In some embodiments, if different desired stylistic rendering effects, such as tone reproduction and feature alignment, conflict, an optimization procedure may be implemented to achieve an acceptable compromise. In some cases, each desired effect may be expressed as an energy term, where the energy is zero when the effect is fully satisfied. A standard optimization approach may then be taken to derive the minimal total energy for the combined goals.

Figure 9:
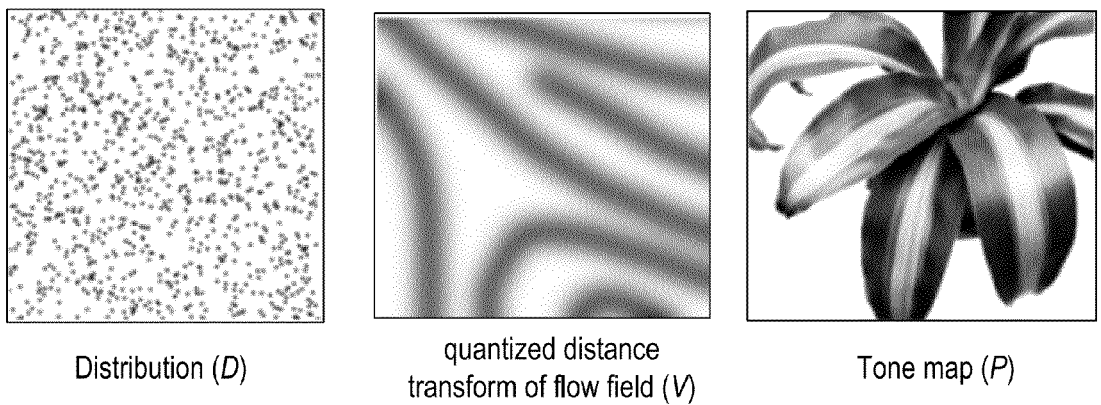
FIG. 9 is used to illustrate an example algorithm that may be used in some embodiments to achieve a desired stylistic rendering effect.

As an example, for the specific stylistic rendering effect of Hedcut stippling, given circular physical markers and virtual marker distributions with blue-noise characteristics, an optimization scheme as follows may be performed. The discussion refers to FIG. 9.

Given an initial virtual marker distribution D, a new distribution D' is to be created for which the actualization approximates P, while aligning to V. V is a feature map. Specifically, V is a quantized distance transform of a flow-field, resulting in a distribution of lines that are somewhat regularly spaced and that follow the flow in an image, where the flow is defined by some feature map. Tone map P is the tone-map derived from the input image, possibly modified by another feature map.

The following is an example algorithm that may be used in some embodiments to achieve the desired stylistic rendering effect. Note that this algorithm is not intended to be limiting, and that similar algorithms may be used in various embodiments to achieve other effects:

1) V-Align: Consider V as a height-field (potential), such that virtual markers will attempt to attain a lower energy state in the potential field, and thus drift into valleys of the field. Simulate a particle system, such that particles (virtual markers) try to keep a certain distance from one another (dependent on the local density, P), while simultaneously trying to attain the lowest possible potential 2) P-Correction: As step 1 (V-Align) may introduce holes (contrast too low) or overpopulated areas (contrast too high), adjust the number of virtual markers locally:

a. If the density is too low (compared to P), add virtual markers. For example, take a Voronoi region with largest coverage discrepancy (where most contrast is missing), and split in two, adding another virtual marker.

b. If the density is too high, remove virtual markers. In some embodiments, virtual markers may be removed first from areas with the most coverage.

3) If step 2 (P-Correction) produced changes in the virtual marker count, go back to (1). Otherwise, the algorithm has converged (for example, convergence may be reached when no markers were added or removed, or alternatively when fewer markers are added or removed than a specified threshold. Note that if the threshold is 1, then "no markers" would be less than the threshold).

Edge Map

Referring again to FIG. 2, in some embodiments, an edge map 106 may be defined, for example based on one or more feature maps 104. The term edge map should be interpreted broadly. An edge map 106 may be derived, for example, via some type of thresholding operation (for example, a soft threshold operation), based on the input values (which may be convolved) or alternatively based on one or more feature maps 104. For example, in various embodiments, an edge map 106 may be derived from the Difference-of-Gaussians, or from large changes in curvature, or from ridges and valleys in brightness, and so on.

Another type of edge with desirable properties corresponds to ridges, related to the zero-crossings of the third order derivative. In some embodiments, to compute this measure, the second order derivative of the tone-mapped image 102 may be computed. Gaussian derivatives may be used to obtain this derivative. The result is a curvature tensor for each pixel of the image. The maximal curvature direction and intensity from this tensor may be extracted (for example, by respectively computing the eigenvectors and eigenvalues of the matrix). The maximal curvature intensity in the maximal curvature direction may be differentiated, again with first order Gaussian derivatives (this allows for simple selection of finer or coarser scale ridge features). The result is a map that contains variations of maximum curvature. The ridges may then be detected when the curvature intensity is strictly positive and the variation of curvature is equal to zero. An abstraction of shapes in the image may be obtained, and coarser scale features may be revealed by increasing the size of the neighborhood used for computing the derivatives.

In at least some embodiments, an edge map 106 may be composited with the output of marker adjustment 124 to produce the final image 150. While simple superposition (multiplication of grayscale values range between 0 and 1) may be adequate in most cases, any suitable compositing technique may be applied.

Extensions

Referring again to FIG. 2, in some embodiments of the stylistic rendering image processing pipeline, different features in a source image 100 may be treated differently. For example, hair might be treated differently from skin, and again differently from clothes. Features in a face might be given special attention. Eyes and the mouth may be stippled much finer (large virtual marker density with small physical markers) than, for example, the forehead.

In some embodiments, additional (possibly semantic) information may be user-specified via feature maps 104, or alternatively may be automatically computed, for example using face alignment techniques. An example face alignment technique that may be used in some embodiments is a generative shape regularization model.

Figure 10:
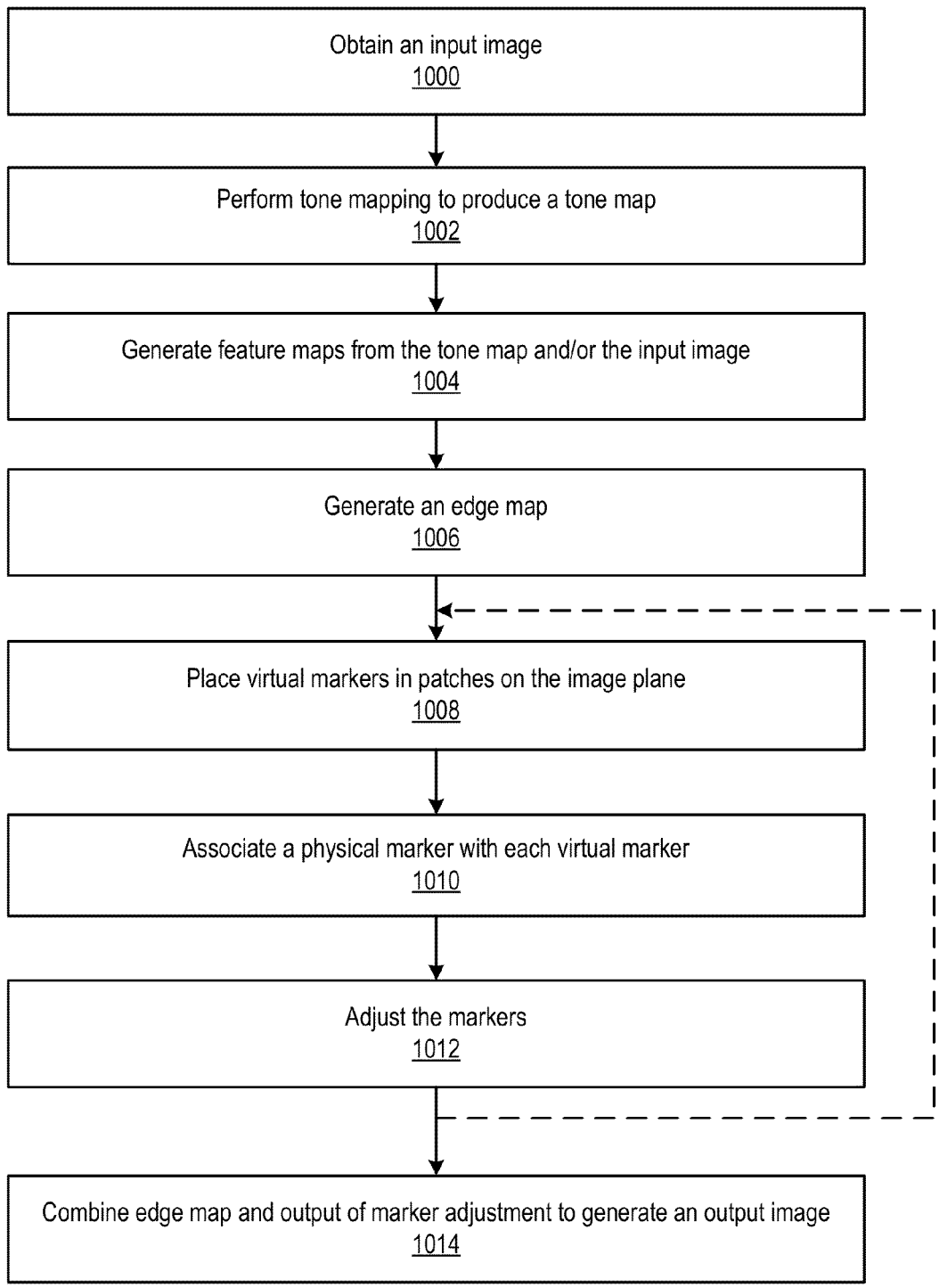
FIG. 10 is a flowchart of a marker-based stylistic rendering method, according to some embodiments.

FIG. 10 is a flowchart of a marker-based stylistic rendering method, according to some embodiments. As indicated at 1000, an input image may be obtained. As indicated at 1002, tone mapping may be performed to produce a tone map. As indicated at 1004, feature maps may be generated, for example from the tone map. As indicated at 1006, an edge map may be generated. As indicated at 1008, virtual markers may be placed on the image plane, for example using patching techniques as previously described. As indicated at 1010, a physical marker may be associated with each virtual marker. Note that, in some embodiments, different types of physical markers may be associated with different ones of the virtual markers in an image. As indicated at 1012, the markers may be adjusted as necessary. Marker placement, association, and adjustment as described in elements 1008, 1010 and 1012 may be guided, for example according to one or more of the generated feature maps. In some embodiments, elements 1008, 1010 and 1012 may be repeated, as indicated by the dashed line, until convergence. For example, convergence may be reached when no markers are added, removed, or adjusted, or alternatively when fewer markers are added, removed, and adjusted than a specified threshold. As indicated at 1014, the edge map and output of the marker adjustment may be combined to generate an output image exhibiting the desired stylistic effect, for example Hedcut stippling.

Example Implementations

Embodiments of the marker-based stylistic rendering methods and the stylistic rendering image processing pipeline described herein may be implemented in graphics applications, for example as or by a stylistic rendering module provided in a stand-alone graphics application or as or by a stylistic rendering module of a graphics application or graphics library. Examples of graphics applications in which embodiments may be implemented may include, but are not limited to, painting, publishing, photography, games, animation, and/or other applications. Embodiments of a stylistic rendering module may implement at least the stylistic rendering image processing pipeline to perform stylistic rendering as described herein. FIG. 11 illustrates an example embodiment of a stylistic rendering module. FIG. 12 illustrates an example of a computer system in which embodiments of a stylistic rendering module or components thereof may be implemented.

FIG. 11 illustrates a stylistic rendering module that may implement one or more of the marker-based stylistic rendering methods as illustrated in FIGS. 1 through 10. FIG. 12 illustrates an example computer system on which embodiments of stylistic rendering module 1100 may be implemented. Module 1100 may receive, as input, an input image 1110 of a scene, for example a digital photograph or digitized photograph, and possibly other input. In some embodiment, module 1100 may also receive user input 1122 via a user interface 1120 specifying, for example, physical markers to be used, desired stylistic rendering effects to be achieved, etc. Module 1100 may implement and perform, according to the input, marker-based stylistic rendering according to the stylistic rendering image processing pipeline as illustrated in FIGS. 2 through 10. Module 1100 generates as output an image 1130. Output image 1130 may, for example, be stored to a storage medium 1140, such as system memory, a disk drive, DVD, CD, etc., and/or displayed to a display device 1150.

Example System

Embodiments of a stylistic rendering module and/or of a stylistic rendering image processing pipeline for performing stylistic rendering as described herein may be executed on one or more computer systems, which may interact with various other devices. One such computer system is illustrated by FIG. 12. In different embodiments, computer system 1200 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1200 includes one or more processors 1210*a*-1210*n* (hereinafter referenced as processor 1210 or processors 1210) coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some embodiments, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

In some embodiments, at least one processor 1210 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the stylistic rendering image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1220 may be configured to store program instructions and/or data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a stylistic rendering module are shown stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a computer-accessible medium may include storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or retrieving data by one or more computer system 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, configured to implement embodiments of a stylistic rendering module as described herein, and data storage 1235, comprising various data accessible by program instructions 1225. In one embodiment, program instructions 1225 may include software elements of embodiments of a stylistic rendering module as illustrated in the above Figures. Data storage 1235 may include data that may be used in embodiments. In other embodiments, other or different software elements and data may be included.

Those skilled in the art will appreciate that computer system 1200 is merely illustrative and is not intended to limit the scope of a stylistic rendering module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
obtaining feature maps for an input image of a scene, each feature map indicating information related to the input image of the scene;
distributing virtual markers across an image plane according to one or more of the feature maps, a virtual marker indicating a point position on the image plane and a distribution density with which the virtual markers are distributed changing across the image plane based, in part, on features indicated in the one or more feature maps;
associating a physical marker with each of the virtual markers, the physical marker associated with a respective virtual marker comprising an image primitive indicative of a shape;
adjusting the physical markers relative to the image plane according to at least one of the feature maps to obtain a coverage of the image plane indicated by the at least one feature map; and
generating a stylized representation of the input image of the scene according to the adjusted physical markers.

2. The method as recited in claim 1, further comprising repeating the distributing, the associating, and the adjusting until a convergence threshold is reached.

3. The method as recited in claim 1, wherein obtaining the feature maps for the input image of the scene comprises automatically generating at least one of the feature maps from the input image of the scene.

4. The method as recited in claim 1, wherein the feature maps include a tone map that indicates tonal range of the input image, and adjusting the physical markers relative to the image plane according to the at least one feature map to obtain the coverage of the image plane indicated by the at least one feature map comprises determining the coverage to be obtained according to the tone map.

5. The method as recited in claim 1, wherein the feature maps include an edge map that indicates edges of one or more objects in the input image, and generating the stylized representation of the input image of the scene comprises compositing the edge map with the adjusted physical markers.

6. The method as recited in claim 1, wherein distributing the virtual markers on the image plane according to the one or more feature maps comprises generating patches that tile the image plane, each patch including a specified distribution of virtual markers.

7. The method as recited in claim 1, wherein one of the feature maps is a flow map that indicates flow directions, and distributing the virtual markers on the image plane according to the one or more feature maps comprises applying a flow-guided texture synthesis technique that applies a texture including a distribution of virtual markers to the image plane according to the flow map.

8. The method as recited in claim 1, wherein one of the feature maps is a flow map that indicates flow directions, and distributing the virtual markers on the image plane according to the one or more feature maps comprises rotating, translating and scaling regions of a texture, each of the regions including a distribution of virtual markers to align the virtual markers with a flow indicated by the flow map.

9. The method as recited in claim 1, wherein adjusting the physical markers relative to the image plane according to the at least one feature map to obtain the coverage of the image plane indicated by the at least feature map comprises adjusting size or orientation of at least one of the physical markers.

10. The method as recited in claim 1, wherein adjusting the physical markers relative to the image plane according to the at least one feature map to obtain the coverage of the image plane indicated by the at least one feature map comprises removing at least one of the physical markers or adding at least one additional physical marker.

11. The method as recited in claim 1, wherein adjusting the physical markers relative to the image plane according to the at least one feature map to obtain the coverage of the image plane indicated by the at least one feature map comprises replacing at least one of the physical markers with a different physical marker of a different shape or size.

12. The method as recited in claim 1, wherein adjusting the physical markers relative to the image plane according to the at least one feature map to obtain the coverage of the image plane indicated by the at least one feature map comprises adjusting a physical property of at least one of the physical markers.

13. A system, comprising:
a display device configured to display an input image of a scene;
a memory and at least one processor to implement a stylistic rendering module configured to:
obtain feature maps for an input image of a scene, each feature map indicating information related to the input image of the scene;
distribute virtual markers on an image plane according to one or more of the feature maps, a virtual marker indicating a point position on the image plane and configured not to be displayed as part of a stylized representation of the input image, a distribution density with which the virtual markers are distributed over regions of the image plane based, in part, on an effect that is to be achieved by the stylized representation, the distribution density being different in different regions of the image plane to achieve different effects for the stylized representation;
associate a physical marker with each of the virtual markers, the physical marker comprising an image primitive indicative of a shape and configured for display as part of the stylized representation of the input image;
adjust the physical markers relative to the image plane according to at least one of the feature maps to obtain a coverage of the image plane indicated by the at least one feature map; and
display, with the display device, the stylized representation of the input image of the scene according to the adjusted physical markers.

14. The system as recited in claim 13, wherein the stylistic rendering module is further configured to repeat the distributing, the associating, and the adjusting until a convergence threshold is reached.

15. The system as recited in claim 13, wherein to distribute the virtual markers on the image plane according to the one or more feature maps, the stylistic rendering module is further configured to generate patches that tile the image plane, each patch including a specified distribution of virtual markers.

16. The system as recited in claim 13, wherein to adjust the physical markers relative to the image plane according to the at least one feature map to obtain the coverage of the image plane indicated by the at least one feature map, the stylistic rendering module is further configured to adjust a physical property of at least one of the physical markers.

17. The system as recited in claim 13, wherein to adjust the physical markers relative to the image plane according to the at least one feature map to obtain the coverage of the image plane indicated by the at least one feature map, the stylistic rendering module is further configured to remove at least one of the physical markers or add at least one additional physical marker.

18. A computer-readable memory storing program instructions that are computer-executable to implement operations comprising:
obtaining feature maps for an input image of a scene, each feature map indicating information related to the input image of the scene;
distributing virtual markers on an image plane according to one or more of the feature maps, a virtual marker indicating a point position on the image plane, and a density with which the virtual markers are distributed over the image plane changing over the image plane based, in part, on features indicated in the one or more feature maps;
associating a physical marker with each of the virtual markers, the physical marker comprising an image primitive indicative of a shape and configured to represent the associated virtual marker for display as part of a stylized representation of the input image;
adjusting the physical markers relative to the image plane according to at least one of the feature maps to obtain a coverage of the image plane indicated by the at least one feature map; and
generating the stylized representation of the input image of the scene according to the adjusted physical markers.

19. The computer-readable memory as recited in claim 18, wherein the operations further comprise repeating the distributing, the associating, and the adjusting until a convergence threshold is reached.

20. The computer-readable memory as recited in claim 18, wherein distributing the virtual markers on the image plane according to one or more feature maps includes generating patches that tile the image plane, each patch including a specified distribution of virtual markers.

* * * * *